(12) United States Patent
Suzuki

(10) Patent No.: US 6,285,174 B1
(45) Date of Patent: Sep. 4, 2001

(54) SWITCHING DC-TO-DC CONVERTER HAVING ON-TIME SIGNAL GENERATION CIRCUIT AND METHOD FOR GENERATING SIGNAL INDICATIVE OF CONVERTER ON-TIME

(75) Inventor: Hidehiko Suzuki, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/687,010

(22) Filed: Oct. 13, 2000

(51) Int. Cl.$^7$ ........................................ G05F 1/56
(52) U.S. Cl. ................................................ 323/288
(58) Field of Search ................................ 323/282, 283, 323/288, 325, 326

(56) References Cited

U.S. PATENT DOCUMENTS

| | | | |
|---|---|---|---|
| 5,003,454 | * 3/1991 | Bruning | 363/81 |
| 5,414,342 | * 5/1995 | Mammano et al. | 323/288 |
| 5,689,176 | * 11/1997 | Deloy | 323/22 |
| 5,923,550 | * 7/1999 | Kumar | 363/69 |
| 5,969,962 | * 10/1999 | Gabor | 363/89 |
| 6,064,172 | * 5/2000 | Kuznetsov | 318/716 |
| 6,104,172 | * 8/2000 | Josephs et al. | 323/222 |

OTHER PUBLICATIONS

Maxim Integrated Products, Inc., "High–Speed, Digitally Adjusted Step–Down Controllers for Notebook CPUS," Data Sheet For MAX1710/MAX/11 Step–Down Controller, p. 11 (1999).

* cited by examiner

Primary Examiner—Adolf Deneke Berhane
(74) Attorney, Agent, or Firm—Girard & Equitz, LLP (57) ABSTRACT

An on-time signal generation circuit for use in a switching DC-to-DC converter, a switching DC-to-DC converter including such a circuit, and a method for generating an on-time signal which is a binary pulse train comprising pulses $T_{ON}$, where the width of each pulse $T_{ON}$ is equal to $T_{OSC}(V_{out}/V_{in})$, where $T_{OSC}$, $V_{in}$, and $V_{out}$ are, respectively, the switching period and the input potential of a DC-to-DC converter, and a control potential. The control potential $V_{out}$ is one of the output potential of the DC-to-DC converter and a DC potential proportional to a desired level of such output potential. The on-time signal generation circuit includes a comparator, a ramp generator with an output coupled to one input of the comparator, and an amplifier with an output coupled to the other input of the comparator. The ramp generator generates a periodic ramped potential having peak level $kV_{in}$ and period $T_{osc}$. The amplifier receives the control potential $V_{out}$, and is configured to assert an amplified potential $kV_{out}$ in response thereto. In response to potential $kV_{out}$ from the amplifier and ramped voltage $kV_{in}$ from the ramp generator, the comparator asserts a pulse train comprising pulses $T_{ON}$. The width of each pulse $T_{ON}$ is equal to $T_{OSC}(V_{out}/V_{in})$, and thus is indicative of the nominal or critical power switch on-time needed for the DC-to-DC converter to produce an output equal to $V_{out}$ in response to input $V_{in}$. Preferably, the on-time signal generation circuit is implemented so that the width of each pulse $T_{ON}$ is equal to $T_{OSC}(V_{out}/V_{in})$ independently of process variations and variations in operating temperature.

24 Claims, 4 Drawing Sheets

SWITCHING DC-TO-DC CONVERTER HAVING ON-TIME SIGNAL GENERATION CIRCUIT AND METHOD FOR GENERATING SIGNAL INDICATIVE OF CONVERTER ON-TIME

BACKGROUND OF THE INVENTION

1. Field of the Invention

The present invention relates to switching controllers for use in switching DC-to-DC converters, in which the duty cycle of each power channel is controlled by a pulse width modulated control signal. More specifically, the invention is a method and circuit for generating a train of pulses whose width is indicative of the nominal power switch on-time needed to produce a DC output potential $V_{out}$ in response to a DC input potential $V_{in}$. The pulse train is useful in a switching controller for a DC-to-DC converter.

2. Description of the Related Art

For convenience, we will use the expression "switching controller" chip below to denote either a controller (implemented as an integrated circuit) which generates power switch control signals for at least one power switch implemented external to the chip (typically multiple power switches, each implemented external to the chip), or a switching "regulator" (implemented as an integrated circuit) which generates such power switch control signals and which also includes at least one power switch implemented on-board the chip (typically multiple power switches, each implemented on-board the chip ). The power switches are typically MOSFET devices.

One type of conventional switching power supply which employs current mode control to achieve output voltage regulation is a DC-to-DC converter including a current mode switching controller chip, and circuitry external to the controller chip which defines one or more power channels (e.g., multiple paralleled power channels). Each power channel includes an inductor and at least one power switch. The controller chip includes a control signal channel for each power channel. Each control signal channel generates a pulse width modulated power switch control signal in response to a feedback signal (a ramped voltage) indicative of the current through the channel's inductor, and a second feedback signal indicative of the DC-to-DC converter's output potential. This allows control of the time-averaged duty cycle of each of the channel's power switches. Typically, a ramped voltage (internally generated in the controller chip) adjusts the effective ramp rate slightly for improved stability through a technique called "slope compensation." The adjusted feedback signal (e.g., one whose value is the difference between the second feedback signal and the internally generated ramped voltage) controls the peak value to which the inductor is allowed to ramp up. Also typically, each pulse width modulated power switch control signal is a binary signal having periodically occurring leading edges, and trailing edges which occur at times determined by the instantaneous value of the feedback signal.

Some DC-to-DC converters include a current mode switching controller chip and buck converter circuitry external to the controller chip. The buck converter circuitry comprises an NMOS transistor (which functions as a power switch, and has a drain coupled to the DC-to-DC converter's input node), an inductor and a current sense resistor (connected in series with the channel of the NMOS transistor), a Schottky diode (coupled between ground and the source of the NMOS transistor), an output capacitor coupled between ground and the output node, and a feedback resistor divider coupled between ground and the output node.

In order to generate a pulse width modulated power switch control signal in response to feedback (or in response to a DC signal which corresponds to a desired DC-to-DC converter output potential $V_{out}$), it would be desirable for DC-to-DC converter switching controller chips (of many different types) to include circuitry for generating a train of pulses whose width is indicative of the nominal power switch on-time needed to produce a DC output potential $V_{out}$ in response to a DC input potential $V_{in}$. It would be especially useful for the circuitry to do so in an accurate manner, independently of process variations (i.e., variations in the manufactured characteristics of integrated circuits produced using the same design) and variations in operating temperature.

SUMMARY OF THE INVENTION

In a class of embodiments, the invention is an on-time signal generation circuit for use in a switching DC-to-DC converter. The on-time generation signal circuit includes a comparator, a ramp generator (whose output is coupled to one input of the comparator), and an amplifier (whose output is coupled to the other input of the comparator). The ramp generator is configured to generate a periodic ramped potential having peak level $kV_{in}$ and period $T_{OSC}$, where Vin is the input potential of a DC-to-DC converter and $T_{OSC}$ is the DC-to-DC converter's switching period. Preferably, the ramp generator includes a transconductance amplifier having an input coupled to receive the input potential $V_{in}$ of the DC-to-DC converter and configured to assert a current I2 (where $I2=gm_2(V_{in})=V_{in}/R2$), ramp generation circuitry (including a capacitor and a switch coupled to periodically discharge the capacitor), and an oscillator coupled and configured to assert control signals to the switch for periodically discharging the switch with period $T_{OSC}$.

The amplifier has an input coupled to receive a DC potential $V_{out}$, where $V_{out}$ is the DC-to-DC converter's output potential or a DC signal which corresponds to a desired level for the DC-to-DC converter's output potential (i.e., a DC potential which is proportional to a desired level for the DC-to-DC converter's output potential with a proportionality constant that can but need not equal one), and is configured to assert an amplified potential $kV_{out}$ in response thereto, where k is the same coefficient as in the peak level $kV_{in}$ of the ramped voltage produced by the ramp generator. In response to potential $kV_{out}$ from the amplifier and the ramped voltage $kV_{in}$ from the ramp generator, the comparator asserts a binary pulse train comprising pulses $T_{ON}$. The leading edges of pulses $T_{ON}$ occur with period $T_{OSC}$. The trailing edge of each pulse $T_{ON}$ occurs when ramped voltage $kV_{in}$ rises to a level matching $kV_{out}$. Thus, the width of each pulse $T_{ON}$ is equal to $T_{OSC}(V_{out}/V_{in})$, and the width of each pulse $T_{ON}$ is indicative of the nominal (or critical) power switch on-time needed for the DC-to-DC converter (in the case that it is a step down DC-to-DC converter) to produce output potential $V_{out}$ (during steady-state operation) in response to input potential $V_{in}$.

Preferably, the on-time signal generation circuit is implemented so that the width of each pulse $T_{ON}$ is accurately equal to $T_{OSC}(V_{out}/V_{in})$, independently of process variations and variations in operating temperature. Preferably, the width of each pulse $T_{ON}$ is caused to be equal to $T_{OSC}(V_{out}/V_{in})$, independently of operating temperature, by implementing the ramp generator and amplifier so that the factor "k" in the peak level $kV_{in}$ of the ramped voltage (produced by the ramp generator) is equal to $k=(C1/C2)(R3/R2)$, where C1 and C2 are the capacitances of periodically discharged capacitors in the ramp generator and R3 and R2 are resistances of resistive elements in the ramp generator.

Preferably also, the ramp generator of the on-time signal generation circuit includes circuitry for compensating for the delay time of the comparator. In a preferred implementation, the ramp generator includes a transconductance amplifier configured to assert a current $I2=gm_2(V_{in})=V_{in}/R2$, ramp generation circuitry (including a current multiplying circuit having an input which receives current I2 and an output (coupled to a first input of the comparator) which asserts a current I4 which is proportional to I2, a capacitor which is charged by the output current of the current multiplying circuit, and a switch coupled to periodically discharge the capacitor with period $T_{OSC}$), an oscillator coupled and configured to assert control signals for periodically discharging the switch with period $T_{OSC}$, and a resistor R5 between the current multiplying circuit and the top plate of the capacitor. Thus, the potential at the top plate of the capacitor is a periodic ramped potential having period $T_{OSC}$ and peak potential $Vpeak=k(V_{in})$, and the potential at the first input of the capacitor is such periodic ramped potential plus an offset potential I4R5. Where $k=(C1/C2)(R3/R2)$, the offset potential I4R5 is equal to $I1(V_{in}/V_{ref})(R3/R2)R5$. Since the offset potential I4R5 is proportional to $V_{in}$, it desirably provides a greater degree of compensation for comparator delay time when $V_{in}$ is greater, causing the error (in the width of pulse $T_{ON}$) due to the comparator delay time to be relatively greater than for smaller values of $V_{in}$. In typical implementations of the comparator, the comparator delay time has a positive temperature coefficient. Since I4 has no significant temperature coefficient, and R5 has a positive temperature coefficient, the offset potential I4R5 desirably varies with temperature in a manner compensating for changes (due to temperature changes) in the comparator delay time.

In another class of embodiments, the invention is a switching DC-to-DC converter including any embodiment of the inventive on-time signal generation circuit.

Another aspect of the invention is a method for generating an on-time signal which is a binary pulse train comprising pulses $T_{ON}$, where the width of each pulse $T_{ON}$ is equal to $T_{OSC}(V_{out}/V_{in})$, where $T_{OSC}$, $V_{out}$, and $V_{in}$ in are, respectively, the switching period, the output potential (or a DC potential which corresponds to a desired level for the output potential), and the input potential of a DC-to-DC converter. The method includes the steps of: (a) in response to the input potential $(V_{in})$ of the DC-to-DC converter, generating a periodic ramped potential having peak level $kV_{in}+V_{offset}$ and period $T_{osc}$, where $V_{offset}$ is optionally equal to zero; (b) in response to a potential $V_{out}$(where $V_{out}$ is the output potential, or a DC potential which corresponds to a desired level for the output potential, of the DC-to-DC converter), generating an amplified potential $kV_{out}$, where k is the same coefficient as in the peak level of the periodic ramped voltage; and (c) generating the binary pulse train by comparing the periodic ramped potential with the amplified potential. Preferably, step (c) includes the step of asserting the periodic ramped potential to a first input of a comparator (said comparator having an output) while asserting the amplified potential to another input of the comparator, thereby causing the comparator to produce the binary pulse train at the output.

In some embodiments, step (a) includes the steps of: receiving the input potential of the DC-to-DC converter at an input of a transconductance amplifier to cause the transconductance amplifier to assert a current I2 (where $I2=gm_2(V_{in})=V_{in}/R2$); employing circuitry to multiply the current I2 by a ratio I1/I3 (determined by reference currents I1 and I3 which are generated by the circuitry) to generate a second current $I4=(I1)(I2)/I3=I1(V_{in}/Vref)(R3/R2)$, where Vref is a reference potential and R3 is a resistance of said circuitry; and asserting the second current I4 to a capacitor to charge the capacitor while periodically discharging the capacitor (with period $T_{OSC}$).

Preferably, step (a) generates the periodic ramped potential in a manner that compensates for a delay time of the comparator. This is accomplished in embodiments in which the offset potential $V_{offset}$ is equal to I4R5, where I4 is a current and R5 is a resistance, and step (a) includes the steps of: receiving the input potential of the DC-to-DC converter at an input of a transconductance amplifier to cause the transconductance amplifier to assert a current I2 equal to $gm_2(V_{in})=V_{in}/R2$; employing circuitry to multiply the current I2 by a ratio I1/I3 (determined by reference currents I1 and I3 which are generated by the circuitry) to generate the current I4 such that said current is equal to $I4=(I1)(I2)/I3=I1(V_{in}/Vref)(R3/R2)$, where Vref is a reference potential and R3 is a resistance of said circuitry, wherein the circuitry includes a resistive element having said resistance R5; and asserting the current I4 through said resistive element to a capacitor (to charge the capacitor) while periodically discharging the capacitor (with period $T_{OSC}$), thereby producing a periodic ramped potential across the capacitor having period $T_{OSC}$ and peak potential $k(V_{in})+I4R5$.

Preferably, step (a) includes the step of operating ramp generation circuitry to generate the periodic ramped potential, wherein the ramp generation circuitry is configured so that the factor "k" in the peak level $kV_{in}$ of the periodic ramped potential is equal to $k=(C1/C2)(R3/R2)$, where C1 and C2 are the capacitances of periodically discharged capacitors of the circuitry and R3 and R2 are resistances of resistors in said circuitry.

DETAILED DESCRIPTION OF THE PREFERRED EMBODIMENTS

An embodiment of the inventive on-time generation circuit, for use in the switching controller of a DC-to-DC converter, will be described with reference to FIG. 1. The FIG. 1 circuit includes comparator 2, ramp generator 1 (whose output is coupled to one input of comparator 2), and amplifier 3 (whose output is coupled to the other input of comparator 2).

Ramp generator 1 includes oscillator 4, transconductance amplifier 5, and ramp generation circuitry 6. Transconductance amplifier 5 has an input coupled to receive the input potential ($V_{in}$) of a DC-to-DC converter, and an output which asserts current I2=$gm_2(V_{in})$=$V_{in}$/R2 to circuitry 6. In response to this amplified potential (and to a train of periodic control pulses from oscillator 4 having period $T_{osc}$), circuitry 6 causes a first input of comparator 2 to be at a periodic ramped potential (having peak level $kV_{in}$ and period $T_{osc}$). Preferably, circuitry 6 includes current multiplying circuit 6A (having an input which receives current I2 and an output which asserts a current proportional to I2), a capacitor which is charged by the output current of circuit 6A, and a switch coupled to periodically discharge the capacitor (with period $T_{OSC}$) in response to control pulses from oscillator 4.

Amplifier 3 has an input coupled to receive potential $V_{out}$ (which is the DC-to-DC converter's output potential, or a DC potential which corresponds to a desired level for such output potential), and is configured to assert an amplified potential $kV_{out}$ in response thereto, where k is the same coefficient as in the peak level $kV_{in}$ of the ramped voltage produced by circuitry 6.

In response to potential $kV_{out}$ from amplifier 3 and ramped voltage $kV_{in}$ from generator 1, comparator 2 asserts a binary pulse train comprising pulses $T_{ON}$. The leading edges (falling edges) of pulses $T_{ON}$ occur with period $T_{OSC}$. The trailing edge (rising edge) of each pulse $T_{ON}$ occurs when ramped voltage $kV_{in}$ rises to a level matching $kV_{out}$. Thus, the width of each pulse $T_{ON}$ is equal to $T_{OSC}(V_{out}/V_{in})$, and the width of each pulse $T_{ON}$ is thus indicative of the nominal (or critical) power switch on-time needed for the DC-to-DC converter to produce output potential $V_{out}$ (during steady-state operation) in response to input potential $V_{in}$.

Figure 1:
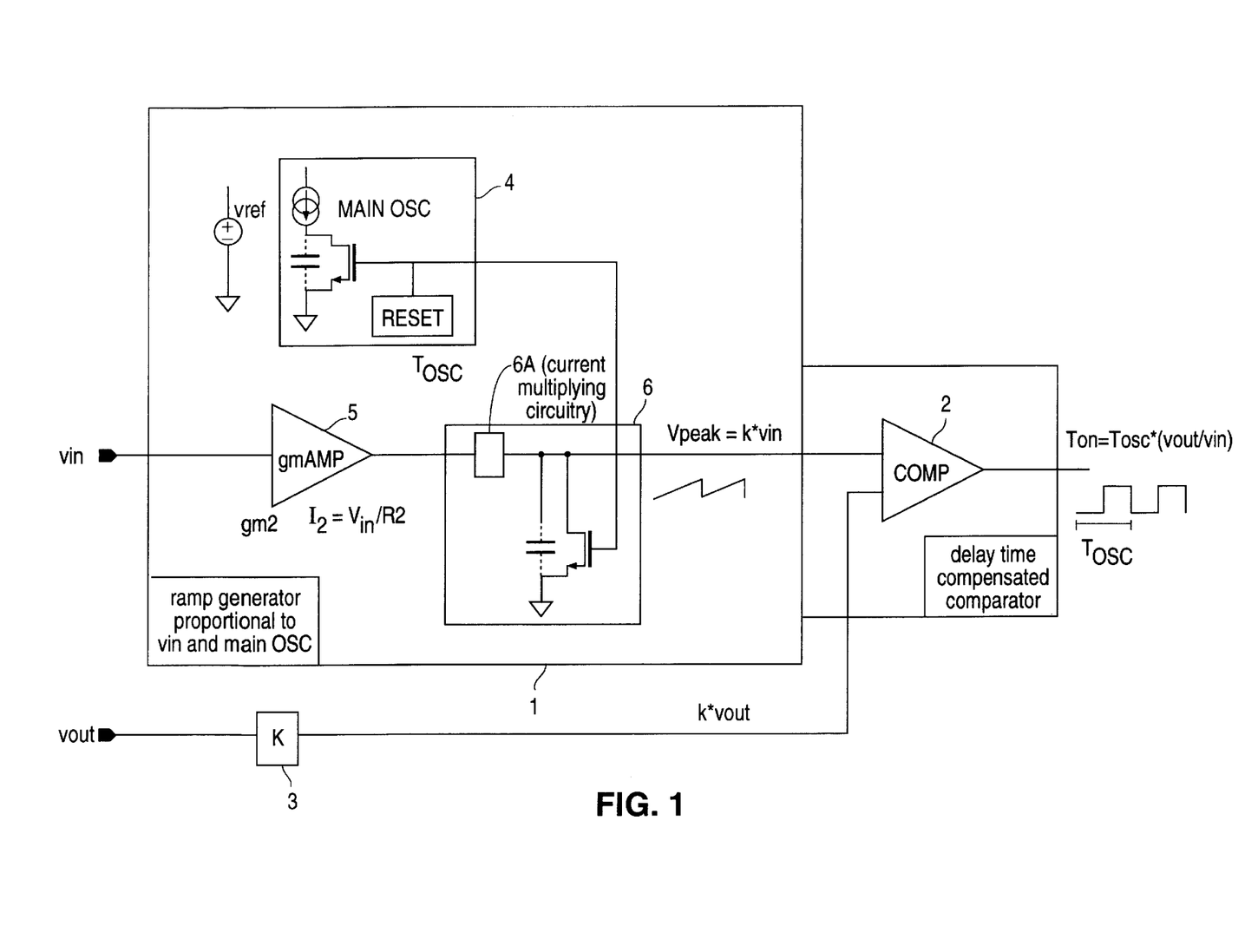
FIG. 1 is a block diagram of an embodiment of the inventive on-time generation circuit, for use in the switching controller of a DC-to-DC converter.

Preferably, the circuitry of FIG. 1 is implemented so that the width of each pulse $T_{ON}$ is accurately equal to $T_{OSC}$ $(V_{out}/V_{in})$, independently of process variations (i.e., variations in the manufactured characteristics of the circuitry, which will typically be integrated circuitry) and variations in operating temperature. Examples of such preferred implementations will be described with reference to FIGS. 2 and 3.

Figure 2:
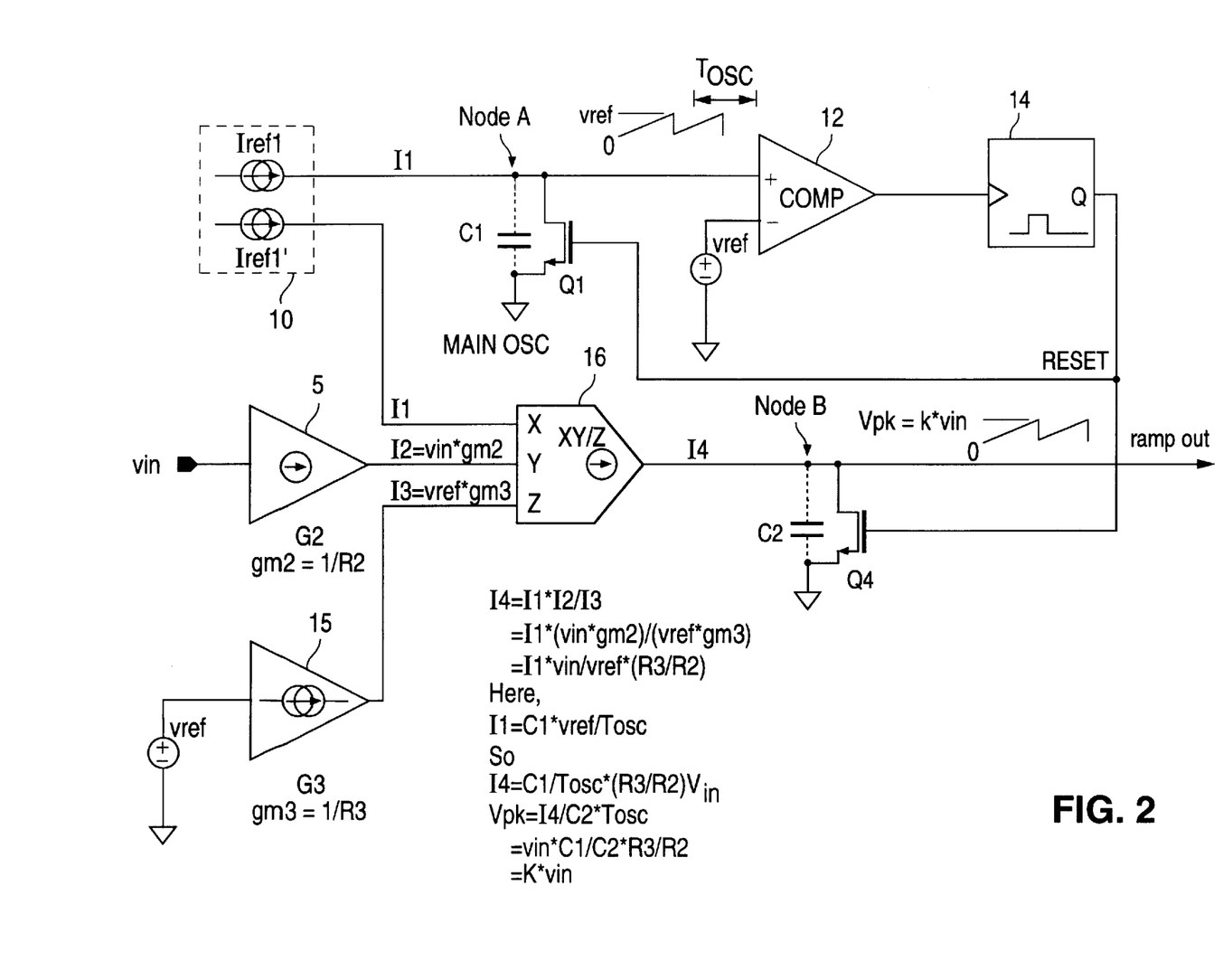
FIG. 2 is a block diagram of a preferred embodiment of circuit 1 of FIG. 1.

FIG. 2 is a block diagram of a preferred embodiment of circuit 1 of FIG. 1, which includes temperature-independent current source 10, capacitors C1 and C2, matching NMOS transistors Q1 and Q4, comparator 12, one-shot 14, transconductance amplifiers 5 and 15, and current multiplier 16, connected as shown. Both the input of amplifier 15 and the inverting input of comparator 12 are maintained at reference potential Vref. Current source 10 sources a current I1 to the "X" input of current multiplier 16, and to node A (the top plate of capacitor C1 and the drain of transistor Q1). After transistor Q1 has been turned on (to discharge capacitor C1) and then turned off (in response to assertion of appropriate control signals to capacitor C1's gate), Node A's potential rises (as capacitor C1 charges) until it reaches reference potential Vref (the potential at which the inverting input of comparator 12 is held). When Node A's potential reaches Vref, a level transition at the output of comparator 12 causes one-shot 14 to assert a brief reset pulse to the gate of each of transistors Q1 and Q4. In response to each reset pulse, transistors Q1 and Q4 turn on for a brief time to discharge capacitors C1 and C2. The level of current I1 is set so that $T_{OSC}$=(Vref)C1/I1. Thus, one-shot 14 asserts a periodic train of reset pulses (to the gates of Q1 and Q4) having period $T_{OSC}$.

The "Y" input of current multiplier 16 is coupled to the output of amplifier 5 to receive current I2 having level I2=$gm_2(V_{in})$=$V_{in}$/R2, where R2 is the resistance of a resistor within amplifier 5. The "Z" input of current multiplier 16 is coupled to the output of transconductance amplifier 15 to receive current I3 having level I3=$gm_3(V_{in})$=Vref/R3, where R3 is the resistance of a resistor within amplifier 15. Thus, the output of current multiplier 16 (at Node B, which is the top plate of capacitor C2 and the drain of transistor Q4) is current I4 whose amplitude is I4=(I1)(I2)/I3=I1($V_{in}$/Vref) (R3/R2). Preferably, current multiplier 16 multiplies the currents in a manner that exploits bipolar transistor Vbe-Ic exponential characteristics.

The FIG. 2 circuit produces at Node B a periodic ramped potential having period $T_{OSC}$ and peak potential Vpeak. More specifically, during each period $T_{OSC}$ after transistor Q4 is turned off (in response to assertion, to capacitor C4's gate, of one of the above-described reset pulses asserted from one shot 14) after being turned on (to discharge the capacitor C4), Node B's potential rises (as capacitor C4 charges) from ground potential until it reaches the peak potential Vpeak=$kV_{in}$, where k=(C1/C2)(R3/R2). At the end of each such period $T_{OSC}$, capacitor C4 is discharged to cause the potential at Node B to fall rapidly back to zero.

During each cycle of the ramped potential at Node B (i.e., once per period $T_{OSC}$), a level transition occurs at the output of comparator 2 when Node B's potential rises to the level $kV_{out}$. More specifically, the output of comparator 2 has falling edges which occur periodically (with period $T_{OSC}$), each falling edge occurring in response to the potential at Node B falling to ground potential. The output of comparator 2 has a rising edge each time the potential at Node B rises to a level matching $kV_{out}$. Thus, the width of each positive-going pulse $T_{ON}$ is equal to $T_{OSC}(V_{out}/V_{in})$.

As noted, amplifier 3 (of FIG. 1) asserts to comparator 2 an amplified potential $kV_{out}$, where k is the same coefficient that multiplies $V_{in}$ in the peak level $kV_{in}$ of the ramped potential at Node B. Thus, amplifier 3 asserts to comparator 2 an amplified potential $kV_{out}$, where k=(C1/C2)(R3/R2).

Amplifiers 5 and 15 are implemented so that their gains (1/R2 and 1/R3, respectively) depend in the same way on temperature. Thus, since the value of k depends on the ratio R3/R2, the gains 1/R2 and 1/R3 do not contribute to any temperature coefficient of the value k even though both 1/R2 and 1/R3 depend on temperature.

Similarly, the capacitors C1 and C2 can be implemented so that their capacitances depend in the same way on temperature. Thus, since the value of k depends on the ratio C1/C2, as well as on the ratio R3/R2, neither the capacitances C1 and C2 nor the gains 1/R2 and 1/R3 contribute to any temperature coefficient or process variation, and the value k is independent on operating temperature of the FIG. 2 circuit.

Figure 3:
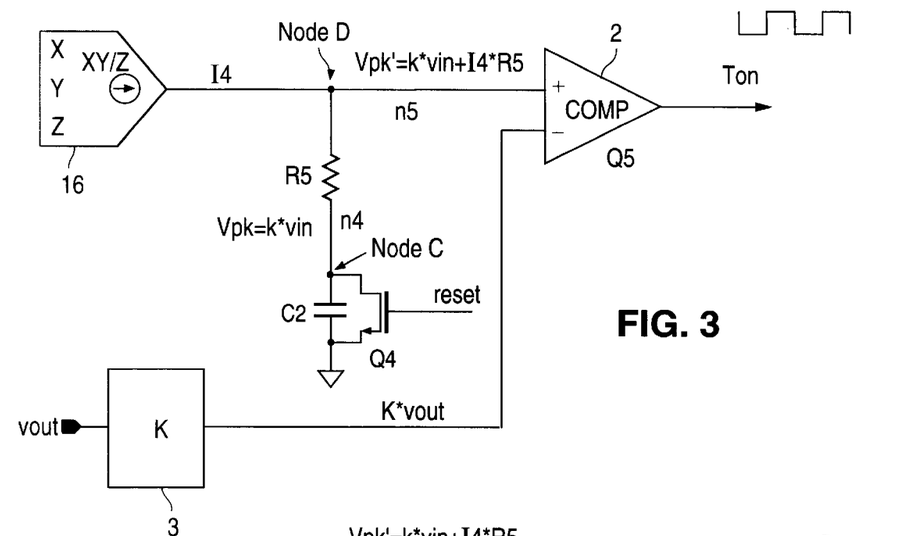
FIG. 3 is a block diagram of a preferred embodiment of the inventive circuitry, including circuits 3 and 2 of FIG. 1 and a variation on elements 16, C2, and Q4 of FIG. 2.

FIG. 3 is a block diagram of a preferred embodiment of the inventive circuitry, including circuits 3 and 2 of FIG. 1 and a variation on elements 16, C2, and Q4 of FIG. 2. The FIG. 3 circuit includes circuitry for compensating for the delay time of comparator 2. Specifically, the FIG. 3 circuit includes resistor R5 between Node C (the top plate of capacitor C2) and Node D (the output of current multiplier 16 and noninverting input of comparator 2). The potential at Node C is the same as at Node B of FIG. 2: a periodic ramped potential having period $T_{OSC}$ and peak potential Vpeak=k($V_{in}$), where k=(C1/C2)(R3/R2). Thus, the potential at Node D is such periodic ramped potential plus the offset potential I4R5 (so that the peak potential of the ramped potential at Node D is k($V_{in}$)+I4R5). The offset potential I4R5 is equal to I1($V_{in}/V_{ref}$)(R3/R2)R5.

Figure 4:
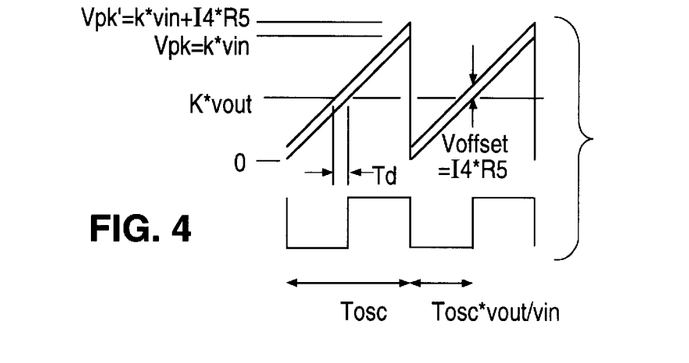
FIG. 4 shows waveforms of signals asserted at the non-inverting input of comparator 2 of the FIG. 3 circuit (assuming both zero and nonzero values of resistor R5) and at the output of such comparator.
Figure 5:
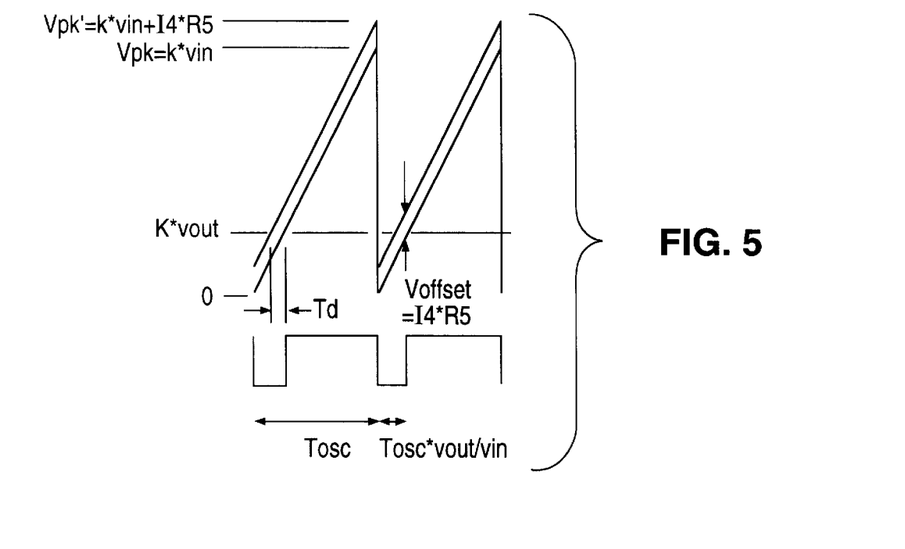
FIG. 5 shows waveforms of signals asserted at the non-inverting input of comparator 2 of the FIG. 3 circuit (assuming both zero and nonzero values of resistor R5) and at the output of such comparator.

The delay time of comparator 2 is Td (shown in FIG. 4). Thus, if R5 were zero (i.e., if there were no delay compensation), the rising edges of the output of comparator 2 would occur at times Td too late (i.e., each rising edge would occur at a time Td after the potential at the noninverting input of comparator 2 rises to a level matching $kV_{out}$). Since each of the above-described pulses $T_{ON}$(of the binary output of comparator 2) has duration $T_{OSC}(V_{out}/V_{in})$, the relative error in the duration of pulses $T_{ON}$(due to the delay time of comparator 2) is greater at higher values of $V_{in}$ than for lower values of $V_{in}$(for a fixed value of $V_{out}$). This can be seen by comparison of FIG. 4 (which assumes a relatively low value of $V_{in}$) and FIG. 5 (which assumes a relatively high value of $V_{in}$).

The offset potential I4R5 compensates for the error in $T_{ON}$ due to the delay time of comparator 2, by causing the comparator output to undergo a low-to-high transition earlier than it would in the absence of the offset potential. Since the offset potential I4R5 is equal to $I1(V_{in}/V_{ref})(R3/R2)R5$, the offset potential increases proportionally to $V_{in}$ and thus provides a greater degree of compensation for comparator delay time when the error (in the width of pulse $T_{ON}$) due to the comparator delay time is relatively greater (as is apparent from comparison of FIGS. 4 and 5).

In typical implementations of comparator 2, the delay Td has a positive temperature coefficient. Since I4 has no significant temperature coefficient, and R5 has a positive temperature coefficient, the offset potential I4R5 desirably varies with temperature in a manner compensating for changes (due to temperature changes) in the comparator delay Td.

Figure 6:
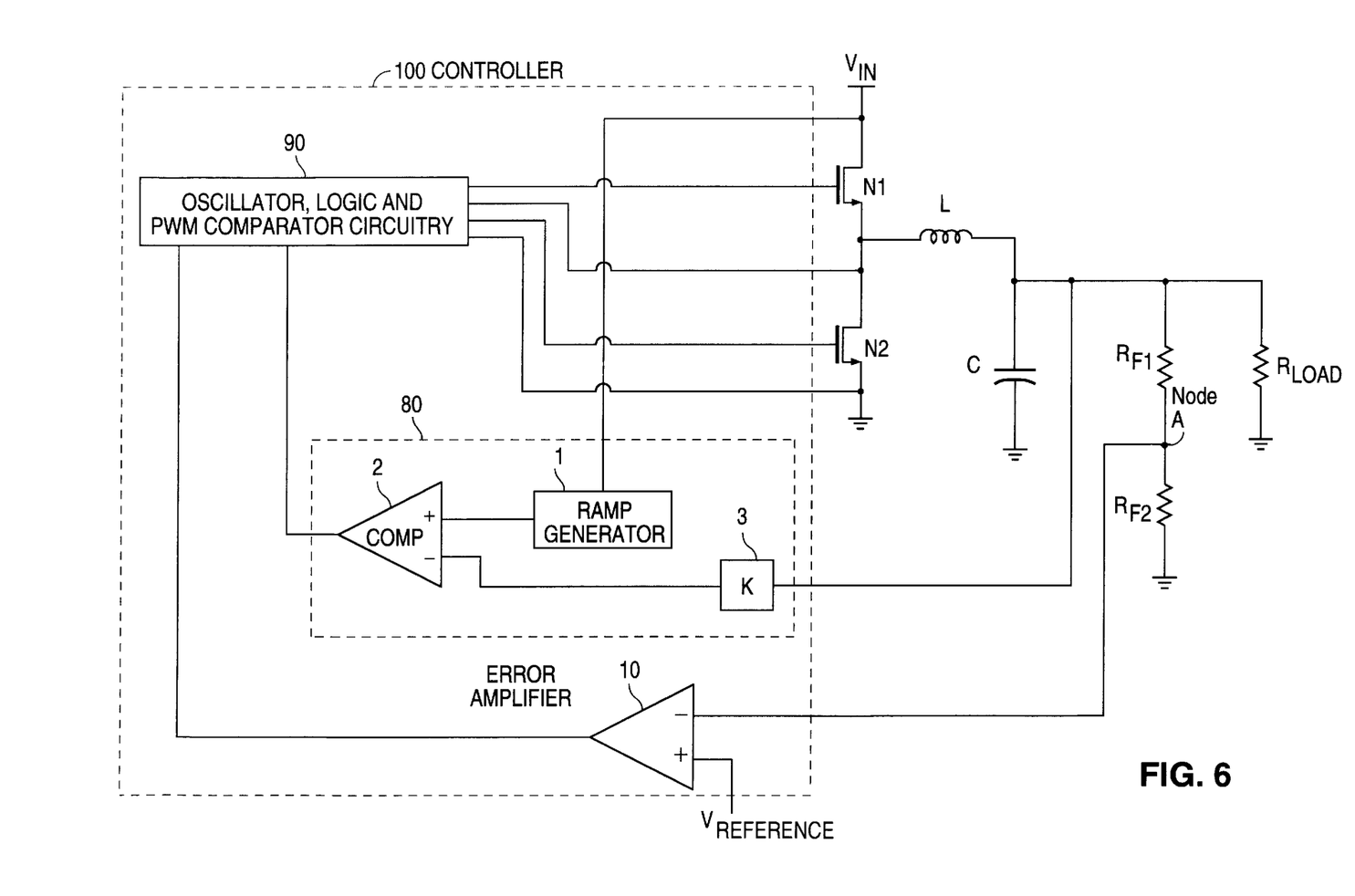
FIG. 6 is a simplified schematic diagram of a preferred embodiment of a DC-to-DC converter whose controller includes the inventive on-time generation circuit.

FIG. 6 is a simplified schematic diagram of a preferred embodiment of a DC-to-DC converter whose controller includes the inventive on-time generation circuit. The DC-to-DC converter of FIG. 6 includes current mode switching controller chip 100, and buck converter circuitry external to the controller chip. The buck converter circuitry of FIG. 6 comprises NMOS transistors N1 and N2 (which function as power switches), inductor L, capacitor $C_{out}$, and feedback resistor divider $R_{F1}$ and $R_{F2}$, connected as shown. The FIG. 6 circuit produces a regulated DC output voltage $V_{out}$ across load $R_{LOAD}$, in response to input DC voltage $V_{in}$.

Controller chip 100 implements a control signal channel which generates pulse width modulated power switch control signals ("PWM switch control" signals) for power switches N1 and N2 in response to a ramped voltage and a train of set pulses (generated by circuitry within oscillator, logic, and PWM comparator circuit 90), a feedback signal (supplied from Node A to the inverting input of error amplifier 10) indicative of the DC-to-DC converter's output potential, and a feedback signal indicative of current through the channel of switch N1. One of the PWM switch control signals controls the gate of power switch N1, and the other PWM switch control signal controls the gate of power switch N2.

Typically, each PWM switch control signal is a binary signal having periodically occurring leading edges, and trailing edges which occur at times determined by the instantaneous value of the feedback signals. The feedback signal indicative of the DC-to-DC converter's output potential is asserted to the inverting input of error amplifier 10, and the noninverting input of error amplifier 10 is at a reference potential $V_{REFERENCE}$. A comparator (within circuit 90) compares the output of error amplifier 10 with the ramped voltage, and other circuitry within circuit 90 generates reset pulses (in response to the output of the comparator) which determine the times at which one of the PWM switch control signals switches off power switch N1. The described use of the ramped voltage improves stability through a technique known as "slope compensation".

Controller chip 100 includes circuit 80, which is an embodiment of the inventive on-time generation circuit. Circuit 80 includes amplifier 3, ramp generator 1, and comparator 2 (connected as shown), which are identical to the correspondingly numbered elements of FIG. 1. The input of amplifier 3 is coupled to the converter's output node (and thus is maintained at the converter's output potential $V_{out}$). The input of ramp generator 1 is coupled to the converter's input node (and thus is maintained at the converter's input potential $V_{in}$). The output of comparator 2(a binary pulse train comprising the above-described inventive pulses $T_{ON}$, each having width equal to $T_{OSC}(V_{out}/V_{in})$ is coupled to circuit 90, and is employed by logic circuitry within circuit 90 to generate the PWM switch control signals.

Although only a preferred embodiment has been described in detail herein those having ordinary skill in the art will certainly understand that many modifications and variations thereon are possible without departing from the teachings hereof. For example, a wide variety of DC-to-DC converters which employ circuitry, other than buck converter circuitry, external to a current mode switching controller can be implemented in accordance with the invention (in one class of such DC-to-DC converters, boost converter circuitry external to a current mode switching controller chip is employed, the boost converter circuitry provides voltage signals indicative of the individual channel currents to the controller chip, and the controller chip is implemented in accordance with the invention). All such modifications and variations are intended to be encompassed within the following claims.

What is claimed is:

1. An on-time signal generation circuit for use in a switching DC-to-DC converter having an input potential $V_{in}$, an output potential, and a switching period $T_{osc}$ during steady state operation, said on-time generation signal circuit comprising:

a comparator having a first input and a second input;

a ramp generator having an output coupled to the first input of the comparator and an input coupled to receive the input potential $V_{in}$, wherein the ramp generator is configured to assert at said output a periodic ramped potential, having peak level $kV_{in}+V_{offset}$ and period $T_{osc}$, in response to said input potential $V_{in}$, wherein $V_{offset}$ can but need not have a nonzero value; and an amplifier having an amplifier output coupled to the second input of the comparator and an amplifier input coupled to receive an amplifier input potential $V_{out}$, wherein the amplifier input potential is one of the output potential and a DC potential proportional to a desired level of the output potential, and wherein the amplifier is configured to assert at the amplifier output an amplified potential $kV_{out}$ in response to the amplifier input potential $V_{out}$.

2. The on-time signal generation circuit of claim 1, wherein the ramp generator includes:

a transconductance amplifier coupled to receive the input potential $V_{in}$ and configured to assert in response to the input potential $V_{in}$ a first current having level $I2=V_{in}/R2$, where R2 is a resistance of a resistive element of the transconductance amplifier; and ramp generation circuitry including current multiplication circuitry coupled to receive the first current, a capacitor coupled to the current multiplication circuitry, a switch coupled to periodically discharge the capacitor with the period $T_{OSC}$ in response to control signals, and an oscillator coupled and configured to assert the control signals to the switch.

3. The on-time signal generation circuit of claim 1, wherein the comparator is configured to assert a pulse train comprising pulses $T_{ON}$ in response to the amplified potential from the amplifier and the ramped potential from the ramp generator, wherein leading edges of the pulses $T_{ON}$ occur with the period $T_{OSC}$ and a trailing edge of each of the pulses $T_{ON}$ occurs when the ramped potential rises to a level matching the amplified potential.

4. The on-time signal generation circuit of claim 3, wherein said on-time signal generation circuit is implemented so that the width of each of the pulses $T_{ON}$ is equal to $T_{OSC}(V_{out}/V_{in})$ independently of process variations and variations in operating temperature.

5. The on-time signal generation circuit of claim 3, wherein the ramp generator and the amplifier are configured such that the peak level of the periodic ramped potential is equal to $kV_{in}+V_{offset}=(C1/C2)(R3/R2)V_{in}+V_{offset}$, where C1 and C2 are the capacitances of periodically discharged capacitors in the ramp generator and R3 and R2 are resistances of resistive elements in the ramp generator, so that the width of each of the pulses $T_{ON}$ is equal to $T_{OSC}(V_{out}/V_{in})$ independently of variations in operating temperature of the on-time signal generation circuit.

6. The on-time signal generation circuit of claim 1, wherein the comparator has a delay time and the ramp generator includes circuitry for compensating for the delay time of the comparator.

7. The on-time signal generation circuit of claim 6, wherein the ramp generator includes:
   a transconductance amplifier configured to assert a first current having level $I2=V_{in}/R2$, where R2 is a resistance of a resistive element of the transconductance amplifier; and
   ramp generation circuitry including current multiplication circuitry coupled to receive the first current and to assert a second current I4 in response to the first current, a capacitor, a resistive element having resistance R5 coupled between the capacitor and the current multiplication circuitry, a switch coupled to periodically discharge the capacitor with the period $T_{OSC}$ in response to control signals, and an oscillator coupled and configured to assert the control signals to the switch, so that the offset potential $V_{offset}$ has a nonzero value equal to I4R5.

8. The on-time signal generation circuit of claim 7, wherein the the peak level of the periodic ramped potential is equal to $kV_{in}+I4R5=(C1/C2)(R3/R2)V_{in}+I4R5=(C1/C2)(R3/R2)V_{in}+I1(V_{in}/V_{ref})(R3/R2)R5$ where C1 and C2 are the capacitances of periodically discharged capacitors in the ramp generator and R3 and R2 are resistances of resistive elements in the ramp generator, I1 is a reference current asserted to the current multiplication circuitry, and $V_{ref}$ is a reference potential asserted to the ramp generation circuitry.

9. The on-time signal generation circuit of claim 1, wherein the amplifier input potential $V_{out}$ is the output potential.

10. A DC-to-DC converter, comprising:
    a switching controller configured to generate control signals and having switching period $T_{osc}$; and
    power circuitry, coupled to the controller and configured to define at least one power channel including an inductor and at least one power switch, wherein the power circuitry asserts an output potential during steady state operation, in response to the control signals and an input potential $V_{in}$, wherein the switching controller includes an on-time signal generation circuit, said on-time generation signal circuit comprising:
    a comparator having a first input and a second input and a comparator output;
    a ramp generator having an output coupled to the first input of the comparator and an input coupled to receive the input potential $V_{in}$, wherein the ramp generator is configured to assert at said output a periodic ramped potential, having peak level $kV_{in}+V_{offset}$ and period $T_{osc}$, in response to said input potential $V_{in}$, wherein $V_{offset}$ can but need not have a nonzero value; and
    an amplifier having an amplifier output coupled to the second input of the comparator and an amplifier input coupled to receive an amplifier input potential $V_{out}$, wherein the amplifier input potential is one of the output potential and a DC potential proportional to a desired level of the output potential, the amplifier is configured to assert at the amplifier output an amplified potential $kV_{out}$ in response to the amplifier input potential $V_{out}$, the comparator asserts an on-time signal at the comparator output in response to the periodic ramped potential and the amplified potential, and the switching controller includes circuitry coupled to the comparator output and configured to generate the control signals in response to signals including said on-time signal.

11. The converter of claim 10, wherein the ramp generator includes:
    a transconductance amplifier coupled to receive the input potential $V_{in}$ and configured to assert in response to the input potential $V_{in}$ a first current having level $I2=V_{in}/R2$, where R2 is a resistance of a resistive element of the transconductance amplifier; and
    ramp generation circuitry including current multiplication circuitry coupled to receive the first current, a capacitor coupled to the current multiplication circuitry, a switch coupled to periodically discharge the capacitor with the period $T_{OSC}$ in response to switch control signals, and an oscillator coupled and configured to assert the switch control signals to the switch.

12. The converter of claim 10, wherein the on-time signal is a pulse train comprising pulses $T_{ON}$, wherein leading edges of the pulses $T_{ON}$ occur with the period $T_{OSC}$ and a trailing edge of each of the pulses $T_{ON}$ occurs when the ramped potential rises to a level matching the amplified potential.

13. The converter of claim 12, wherein said on-time signal generation circuit is implemented so that the width of each of the pulses $T_{ON}$ is equal to $T_{OSC}(V_{out}/V_{in})$ independently of process variations and variations in operating temperature.

14. The converter of claim 12, wherein the ramp generator and the amplifier are configured such that the peak level of the periodic ramped potential is equal to $kV_{in}+V_{offset}=(C1/C2)(R3/R2)V_{in}+V_{offset}$, where C1 and C2 are the capacitances of periodically discharged capacitors in the ramp generator and R3 and R2 are resistances of resistive elements in the ramp generator, so that the width of each of the pulses $T_{ON}$ is equal to $T_{OSC}(V_{out}/V_{in})$ independently of variations in operating temperature of the on-time signal generation circuit.

15. The converter of claim 10, wherein the comparator has a delay time and the ramp generator includes circuitry for compensating for the delay time of the comparator.

16. The converter of claim 15, wherein the ramp generator includes:

a transconductance amplifier configured to assert a first current having level $I2=V_{in}/R2$, where R2 is a resistance of a resistive element of the transconductance amplifier; and ramp generation circuitry including current multiplication circuitry coupled to receive the first current and to assert a second current I4 in response to the first current, a capacitor, a resistive element having resistance R5 coupled between the capacitor and the current multiplication circuitry, a switch coupled to periodically discharge the capacitor with the period $T_{OSC}$ in response to switch control signals, and an oscillator coupled and configured to assert the switch control signals to the switch, so that the offset potential $V_{offset}$ has a nonzero value equal to I4R5.

17. The converter of claim 16, wherein the the peak level of the periodic ramped potential is equal to $kV_{in}+I4R5=(C1/C2)(R3/R2)V_{in}+I4R5=(C1/C2)(R3/R2)V_{in}+I1(V_{in}/V_{ref})(R3/R2)R5$ where C1 and C2 are the capacitances of periodically discharged capacitors in the ramp generator and R3 and R2 are resistances of resistive elements in the ramp generator, I1 is a reference current asserted to the current multiplication circuitry, and $V_{ref}$ is a reference potential asserted to the ramp generation circuitry.

18. A method for generating an on-time signal which is a pulse train comprising pulses $T_{ON}$, such that each of the pulses $T_{ON}$ has a width equal to $T_{OSC}(V_{out}/V_{in})$, where $T_{OSC}$, $V_{out}$, and $V_{in}$ are, respectively, a switching period of a DC-to-DC converter, a control potential, and an input potential of the DC-to-DC converter, wherein the control potential $V_{out}$ is one of an output potential of the DC-to-DC converter and a DC potential proportional to a desired level of said output potential, said method including the steps of:

(a) in response to the input potential $V_{in}$ of the DC-to-DC converter, generating a periodic ramped potential having peak level $kV_{in}+V_{offset}$ and the period $T_{osc}$, where $V_{offset}$ can but need not have a nonzero value;

(b) in response to the control potential $V_{out}$, generating an amplified potential $kV_{out}$; and (c) generating the binary pulse train by comparing the periodic ramped potential with the amplified potential.

19. The method of claim 18, wherein step (c) includes the step of asserting the periodic ramped potential to a first input of a comparator, said comparator having a comparator output, while asserting the amplified potential to another input of the comparator, thereby causing the comparator to produce the binary pulse train at the comparator output.

20. The method of claim 18, wherein step (a) includes the steps of:

receiving the input potential $V_{in}$ an input of a transconductance amplifier to cause the transconductance amplifier to assert a first current having level $I2=V_{in}/R2$;

employing multiplication circuitry to multiply the first current by a ratio I1/I3, said ratio being determined by reference currents I1 and I3 generated by the multiplication circuitry, to generate a second current having level $I4=(I1)(I2)/I3=I1(V_{in}/Vref)(R3/R2)$, where Vref is a reference potential and R3 is a resistance of a resistive element of said multiplication circuitry; and asserting the second current to a capacitor while periodically discharging the capacitor with the period $T_{OSC}$.

21. The method of claim 19, wherein the comparator has a delay time and step (a) includes the step of generating the periodic ramped potential in a manner that compensates for said delay time.

22. The method of claim 21, wherein the offset potential $V_{offset}$ is equal to I4R5, where I4 is a second current and R5 is a resistance, and step (a) includes the steps of:

receiving the input potential $V_{in}$ at an input of a transconductance amplifier to cause the transconductance amplifier to assert a first current having level I2 equal to $I2=V_{in}/R2$;

employing multiplication circuitry to multiply the first current by a ratio I1/I3, said ratio being determined by reference currents I1 and I3 generated by the multiplication circuitry, to generate the second current such that said second current is equal to $I4=(I1)(I2)/I3=I1(V_{in}/Vref)(R3/R2)$, where Vref is a reference potential and R3 is a resistance of said multiplication circuitry, wherein the multiplication circuitry includes a resistive element having said resistance R5; and asserting the second current through said resistive element to a capacitor, while periodically discharging the capacitor with period $T_{OSC}$, thereby producing the periodic ramped potential across the capacitor with said period $T_{OSC}$ and a peak potential equal to $k(V_{in})+I4R5$.

23. The method of claim 18, wherein step (a) includes the step of operating ramp generation circuitry to generate the periodic ramped potential, wherein the ramp generation circuitry is configured so that the peak level $kV_{in}+V_{offset}$ of the periodic ramped potential is equal to $kV_{in}=(C1/C2)(R3/R2)+V_{offset}$, where C1 and C2 are the capacitances of periodically discharged capacitors of the ramp generation circuitry and R3 and R2 are resistances of resistive elements of said ramp generation circuitry.

24. The method of claim 18, wherein the control potential $V_{out}$ is the output potential of the DC-to-DC converter.

* * * * *